United States Patent
Ringenbach

[19]

[11] Patent Number: 6,123,128
[45] Date of Patent: Sep. 26, 2000

[54] FLOATING WHEEL ASSEMBLY

[76] Inventor: Peter C. Ringenbach, P.O. Box 1157, Buffalo, N.Y. 14213

[21] Appl. No.: 09/280,742

[22] Filed: Mar. 29, 1999

[51] Int. Cl.$^7$ ....................................................... B60B 9/10
[52] U.S. Cl. ............................................... 152/47; 152/40
[58] Field of Search .................. 152/17, 40, 42, 152/43, 47, 48, 49, 50, 51, 52, 1, 155, 157; 295/11

[56] References Cited

U.S. PATENT DOCUMENTS

| | | | |
|---|---|---|---|
| 1,638,621 | 8/1927 | De Araujo | 152/51 |
| 2,202,080 | 5/1940 | Baker | 152/48 |
| 2,920,673 | 1/1960 | Boldt et al. | 152/47 |
| 4,765,382 | 8/1988 | Sahagian | 152/48 |

FOREIGN PATENT DOCUMENTS

| | | | |
|---|---|---|---|
| 174900 | 1/1921 | United Kingdom | 152/43 |

*Primary Examiner*—S. Joseph Morano
*Assistant Examiner*—Jason R. Bellinger
*Attorney, Agent, or Firm*—Crossetta & Associates

[57] ABSTRACT

A cushion wheel assembly having a central hub coaxially surrounded by a resilient circular ring which is coaxially surrounded by a pneumatic tire on a mounting rim. The components are arranged so that axial compression of the resilient ring locks the components of the assembly into a cohesive unit, which is easily assembled and disassembled for convenient mounting to a vehicle and/or repair of high wear components.

18 Claims, 3 Drawing Sheets

FLOATING WHEEL ASSEMBLY

The present invention relates to a quick change floating wheel assembly which has particular utility in heavy motor vehicles which have frictional brake assemblies arranged at about the wheel.

BACKGROUND OF THE INVENTION

Stress imposed on the wheels and suspension of heavy load bearing vehicles, occasioned by the irregularities of road surfaces, is a significant factor in tire performance and fuel efficiency. For fuel efficiency it is generally desirable to maintain a high pneumatic tire pressure. Particularly under load bearing conditions, the higher the pneumatic tire pressure the greater the shock imposed upon the wheels and suspension of the vehicle by irregular road surfaces such as holes and the like, and the greater the incidence of vehicle wheel and suspension breakdown. As a result, the selection of pneumatic tire pressure is generally lowered as a compromise to fuel and treadwear efficiency for reduced probability of suspension and wheel damage.

Attempts have been made to provide cushion wheel assemblies which enable the use of higher pneumatic tire pressures without the accompanying problems associated with shock. U.S. Pat. No. 1,895,579 discloses a cushion wheel assembly wherein a rigid circular rim is configured for mounting a pneumatic tire on the outer circumference thereof and an annular ring, comprising a series of elastomeric felloe-sections, is arranged between the inner circumference of the rigid circular rim and the outer circumference of a rigid hub comprising bearings and the like for mounting the wheel to an axle. Such arrangement relies upon vulcanized or the like bonding among the felloe-sections and other components of the arrangement to maintain the integrity of the assembly and such bonding is prone to failure during use.

British Provisional Patent 388,794 discloses a cushion wheel arrangement wherein a spoke wheel embodiment supporting a pneumatic tire, comprises a hub assembly having a resilient material surrounding a central component which has a complex arrangement for attachment to the hub. Such arrangement requires a complex procedure for removal of the wheel to enable changing a tire and has not enjoyed widespread commercial success.

An object of the present invention is to provide a suitable cushion assembly for a wheel which enables use of higher tire inflation pressures and yet reduces shock imposed upon a vehicle suspension system.

A further object of the invention is to provide a simple wheel cushion assembly which enables convenient and easy removal for tire and/or brake service.

These and other objects of the invention will become apparent from the following recitation of the invention.

SUMMARY OF THE INVENTION

The present invention constitutes a simple, efficient and easily disassembled cushion wheel and disk brake assembly for supporting a high pressure pneumatic tire. The assembly comprises, as its major components, a cylindrical pneumatic tire mounting rim, a hub, and a circular ring of resilient material mounted between said hub and the tire mounting rim.

The circular ring, hereinafter referred to as the resilient ring, comprises a generally symmetrical ring of resilient material having a central opening. The ring can have any suitable cross section, such as circular, oval, square or polygonal. Generally, it is preferred that the ring have a generally round cross-section and that its central opening be generally circular, e.g. that the ring be donut shaped. The resilient ring is shaped to mount over the hub, and have a circumferential surface which engages the underside of the tire mounting rim. The ring must be sufficiently resilient so that when compressed from its static shape to a distended assembled shape in the device of the invention, it exerts a continuous force from its assembled shape to return to its static shape, the force being sufficient to secure the tire mounting rim in a fixed relationship to the hub. Further, when compressed from its assembled state in response to a vehicle driving incident, that it will exert a force sufficient to return to its assembled state.

The resilient ring can be formed from any suitable material which when deformed from its static shape exerts a force to return to that static state. Various rubber and compounds thereof, elastomers and compounds thereof are suitable resilient materials from which the resilient ring can be formed, including foamed and/or otherwise modified resilient material.

The hub is generally cylindrical in shape having a front surface facing outward from the vehicle upon mounting, and a rear surface facing inward of the vehicle. It is generally formed from a rigid material such as metal, rigid plastic and/or compositions thereof and the like and comprises a central opening arranged at about its axis to enable mounting the hub to an axle and the like, with the rear surface facing inward of the axle. The hub preferably comprises a disk brake rotor and/or drum brake means integrally molded or mounted to its rear surface, which is arranged for co-acting with caliper pads and/or brake shoes in a braking system. In one embodiment, the central opening of the hub is splined, grooved, slotted, shaped or otherwise enabled to mate with splines, grooves, slots, shapes or otherwise for fixedly mounting the hub to a rotatable axle. In another embodiment, the hub comprises bearing or the like means for rotatably mounting the hub to a non-rotating axle.

The hub, comprises front and rear outwardly extending opposing flanges about its circumference, arranged to define a slot about the circumference of the hub. The rear flange is of greater height as compared to the front flange, and the facing surfaces of the opposing flanges are preferably tapered such that the slot defined by the two flanges, tapers inwardly toward the central axis of the hub. The circumferential height of the front flange is sized greater than the relaxed circumference of the central opening of a resilient ring, but not so great as to preclude convenient stretching of the resilient ring and thus distention of its central opening for mounting such resilient ring into the slot defined by the opposing flanges. The circumferential height of the rear flange is sized to generally preclude stretching the resilient ring thereover, generally to about the height of the circumference of the mounted resilient ring when the device is assembled. Preferably, the rear flange extends to a point along the side of the assembled ring which is below the height of the hub mounted resilient ring. The relationship of sizing of the opposing hub flanges and a resilient ring is that the mass and sizing of the resilient ring is sufficient such that when the resilient ring is mounted on the hub, the surface of the resilient ring surrounding the hub, securely grips the circumference of the slot in the hub formed by the opposing sides of flanges, and enable at least the rear side of the resilient ring to engage the tapered face of the rear flange.

The pneumatic tire mounting rim of the device of the invention also comprises front and rear outwardly extending opposing tire mounting flanges, the tire mounting flanges being sized to engage outside surfaces of the tire adjacent the opposing tire beads which surround the central opening of the pneumatic tire. The sizing and shape of front and rear tire mounting flanges comprised on a tire mounting rim are to enable secure mounting of a pneumatic tire and are well known and generally considered conventional in the prior art. Preferably, the rim surface between the tire mounting flanges comprises a circumferential valley which extends inwardly into the central opening of the rim, such that when the rim is mounted over a resilient ring, the peak of a circumferential valley of the rim engages the resilient ring and compression of the sides of the resilient ring forms a mating circumferential valley in the periphery of the resilient ring.

The mounting rim of the invention comprises an annular stop ring which extends into the central opening of the mounting rim adjacent about the front flange. In one embodiment, the annular stop ring is molded integral with and/or is otherwise fixedly mounted to the mounting rim. In another embodiment, the annular stop ring is movably fitted into the circular opening of the rim and is prevented from being removed from the front of the rim by engaging an inside surface of an inwardly extending front stop ring flange on the rim. The annular stop ring is configured and/or positioned so that its inside surface engages the outside surface of the mounted resilient ring. In a preferred embodiment, the inside surface of the annular ring is generally about parallel to the tapered surface of the rear flange of the hub when the rim is mounted to the resilient ring.

The front of the hub comprises a plurality of mounting means arranged for removably mounting one or more pad mounts. The pad mount is configured to be positioned opposing the front surface of the annular stop ring and arranged to compress a resilient compression pad against the annular stop ring. It should be understood that the mounting means can comprise holes for bolts, threaded studs or any convenient means for secure attachment of a pad mount to the hub. The invention includes a plurality of spaced pad mounts engaging one or more resilient compression pads and/or an annular ring plate means arranged to compress a plurality of pads or a single annular resilient compression pad against the annular stop ring.

In the assembly of the cushion wheel of the invention, the annular stop ring is generally mounted to the tire mounting rim and the pneumatic tire mounted to the rim. The hub is mounted to an axle end of the vehicle and the resilient ring is stretched over the forward flange with the central opening of the resilient ring firmly seated into the slot formed by the front and rear hub flanges. The mass of the mounted resilient ring is generally in a semi-relaxed state at this time with the sides of the ring extending outward, the exterior circumference being relaxed or slightly stretched and the surface defining the central opening being slightly stretched over the circumference of the hub. The assembled tire mounting rim is mounted to encircle the resilient ring, generally being a close friction fit over the relaxed circumference of the resilient ring with the interior surface of the annular stop ring engaging the side wall of the resilient ring. One or more pad mounts are then loosely mounted to the hub, and a resilient compression pad(s) is inserted between a mounting tab and the annular stop ring. The pad mount(s) is then tightened, drawing it closer to the hub and compressing a compression pad against the opposing annular stop ring. The annular ring is pushed by the tightening of the pad mount(s) which in turn compress the side walls of the resilient ring between the annular ring and the rear flange of the hub. The compression of the side walls act to compress the resilient ring into a smaller assembled space providing a close friction grip of the tire mounting rim and at least the rear hub flange, slot and annular stop ring with the resilient ring.

In over the road operation, the highly inflated pneumatic tire transmits shock from an impact with an uneven road surface to the ground side of the resilient ring, causing the ring to be radially impact compressed from its mounted state at about the spot radius of impact. The impact compressed resilient ring expands sideways to impact compress the compression pads, which in turn dissipates some of the force of the shock. Simultaneously, the impact compressed ring expands circumferentially dissipating more of the force of the shock. As can be seen, at least a portion of the initial ground impact is dissipated through the pneumatic tire and the resilient ring before encountering the suspension.

DETAILED DESCRIPTION OF THE INVENTION

Figure 1:
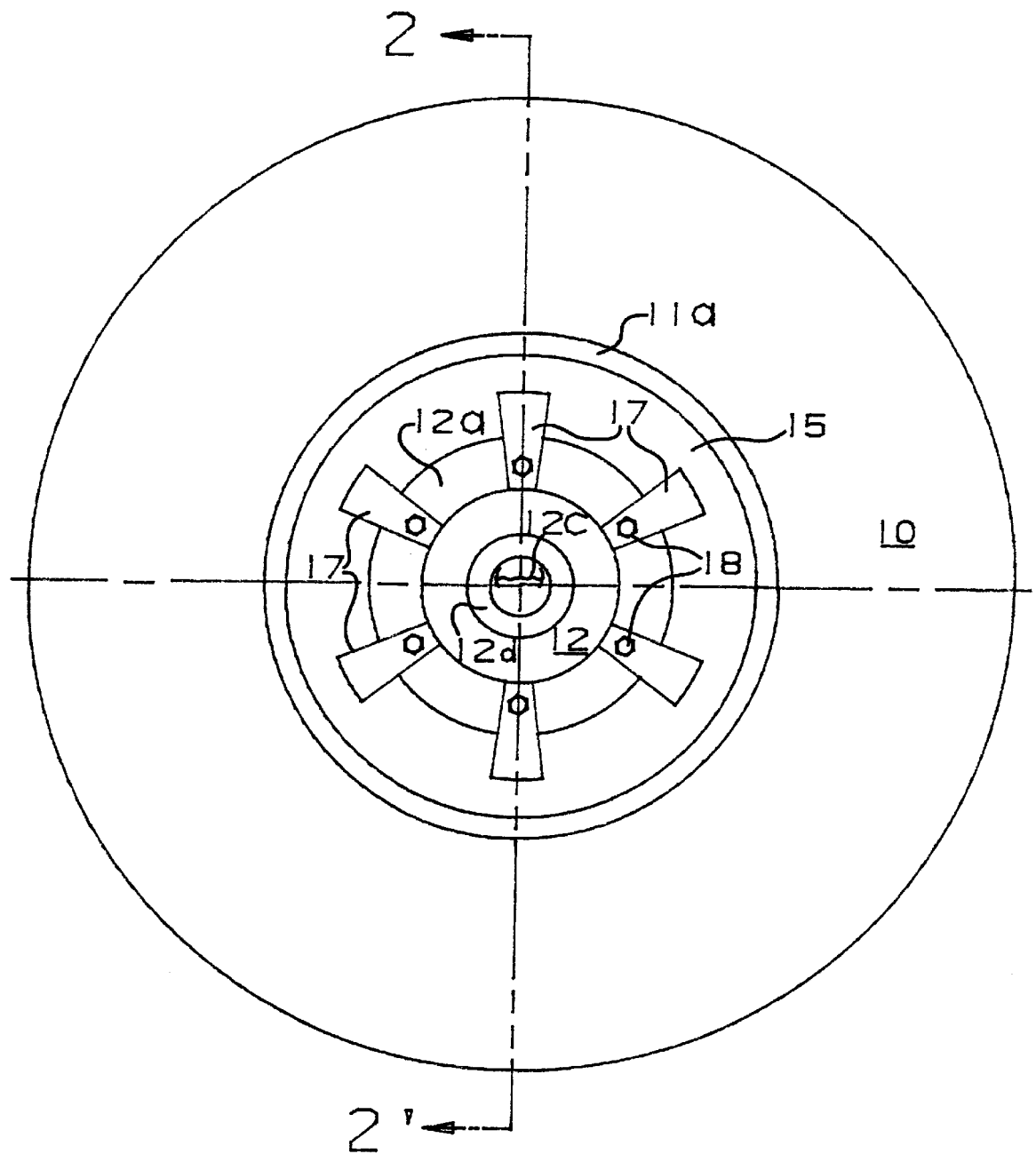
FIG. 1 is a side plan view of an embodiment of the cushion wheel assembly of the invention.
Figure 2:
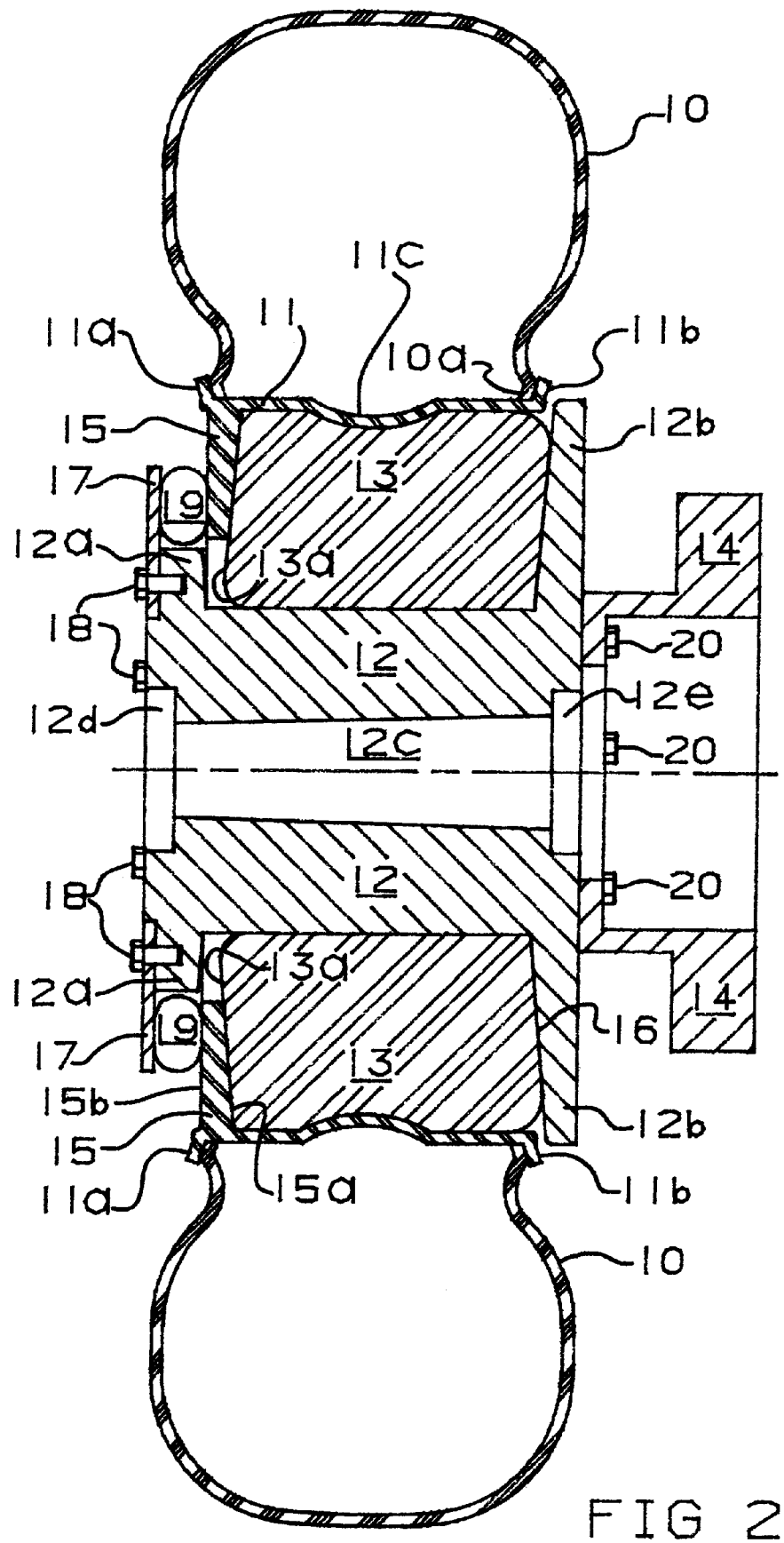
FIG. 2 is a partial sectional view of the assembly of FIG. 1 taken along about line 2–2'.

Beginning with FIGS. 1 and 2, wherein a side plan view and sectional view respectively of an embodiment of the cushion wheel of the invention is illustrated as comprising a pneumatic tire 10 including mounting bead 10a, tire mounting rim 11 having front and rear tire mounting flanges 11a and 11b respectively and a central valley 11c, hub 12 having front and rear flanges 12a and 12b respectively, circular resilient ring 13 and brake component 14.

In this illustrated embodiment, annular stop ring 15 is formed integral with the tire mounting rim. Therein, the inside surface 15a of annular stop ring 15 is illustrated as engaging outside surface 13a of circular resilient ring 13, with inside surface 15a of annular stop ring 15 being tapered to be about parallel to tapered surface 16 of rear flange 12b of hub 12.

The front of hub 12 comprises a plurality of mounting means arranged for removably mounting the pneumatic tire and rim to the hub. In the illustrated embodiment, pad mounts 17 are bolt mounted 18 to hub 12, opposite outside surface 15b of annular stop ring 15, and are arranged to compress resilient compression pads 19 against the annular stop ring, which in turn compress circular resilient ring 13, moving rim 11 axially toward rear flange 12b of hub 12. Bolts 18 are sized in length to allow mounting of pad mounts 17 and compression pads 19 to the hub in a close friction fit over the relaxed circumference of the resilient ring, yet enable tightening down bolts 18 sufficient to engage the rim and the resilient ring in a compressed operable relationship.

Hub 12 is illustrated as comprising central opening 12c. In the illustrated embodiment, central opening 12c is sized to accept inside and outside bearing arrangements (not shown) at 12d and 12e for mounting an axle therethrough Such bearing arrangement are well known in the prior art. In the illustrated embodiment, Hub 12 is illustrated as comprising a brake component 14, which is depicted as a disk brake rotor, which is removably mounted to hub 12 by bolts 20. It is contemplated that a mating caliper arrangement is mounted to the vehicle in such arrangement as to enable convenient swinging of the caliper away from the rotor for removal of the wheel assembly. It should be understood that though the depicted brake component is a rotor, such component may also comprise a drum or the like for a brake shoe and/or band mating arrangement or the like.

As can be seen, the cushion wheel assembly of the invention enables convenient removal of the pneumatic tire, rim and resilient ring by loosening and/or removing bolts 18. This enables convenient disassembly to allow easier handling of heavy parts on removal. Thus, for example, high wear parts, such as tires can be removed and replaced without removal of the heavy mass of the hub. Similarly, the rim and tire, resilient ring, and hub can be sequentially removed to avoid handling of the total mass of wheel and hub as a single unit.

Figure 3:
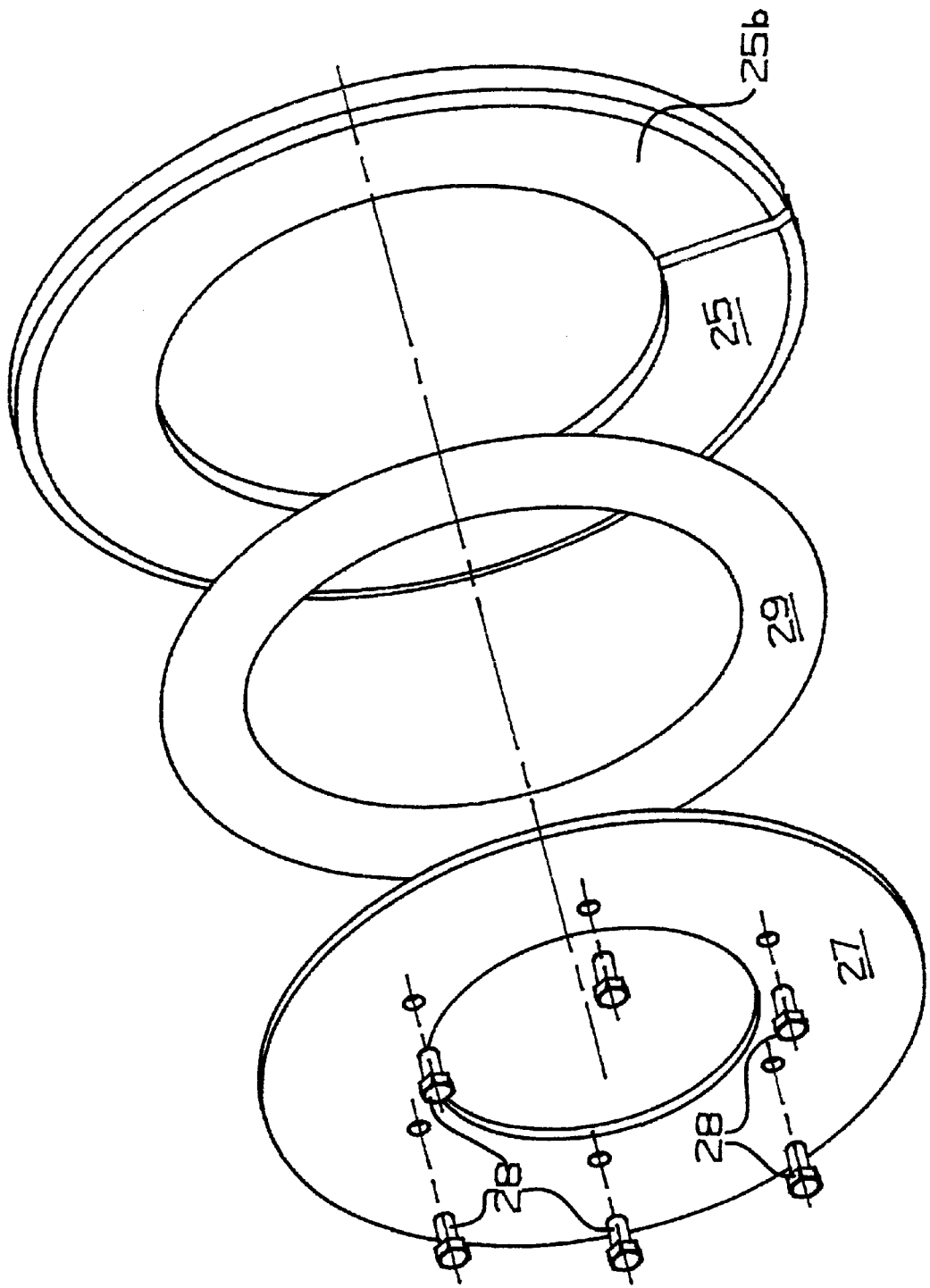
FIG. 3 is an exploded perspective view of another embodiment of a compression pad mount arrangement of the invention.

FIG. 3 is an exploded perspective view of another means for removably mounting the pneumatic tire and rim to the hub. In this illustrated embodiment, a circular pad mount 27 is bolt mounted 28 to the hub, opposite outside surface 25b of axially slidably mounted annular split stop ring 25, and is arranged to compress a circular resilient compression pad 29 against surface 25a of the annular stop ring. Again, as in the prior illustrated arrangement, compression of pad 29 in turn causes annular stop ring 25 to compress circular resilient ring 13, but in this embodiment the stop ring and/or the rim may move axially toward the rear flange of the hub. Bolts 28 are again sized in length to allow mounting of pad mount 27 and compression pad 29 to the hub in a close friction fit over the relaxed circumference of the resilient ring, yet enable tightening down bolts 28 sufficient to engage the rim and the resilient ring in a compressed operable relationship.

While the basic operation of the invention has been described, many modifications are possible and are within the contemplation of the invention.

I claim:

1. A cushion wheel assembly comprising:

a generally cylindrical hub, having a central opening along its axis and spaced front and rear opposing hub flanges extending radially outward from the periphery of said hub, said spaced flanges having generally facing opposing sides which define a circumferential slot around the perimeter of said hub;

a tire mounting rim, arranged to coaxially surround said slot around said perimeter of said hub, said rim comprising means for mounting a pneumatic tire coaxially around the periphery of said rim;

a resilient circular ring having front and rear sidewalls and a central opening, said ring being mounted in said slot around said perimeter of said hub between said hub and said tire mounting rim, with said rear sidewall arranged to oppose the facing side of said rear flange and said front sidewall arranged to oppose the facing side of said front flange;

an annular stop ring, arranged to extend inwardly from said rim; and means, removably mounted to said hub, arranged to engage said annular stop ring and compress said resilient ring sideways to an assembled shape which firmly grips said hub to said tire mounting rim.

2. The assembly of claim 1 wherein said rear hub flange is of a greater radius than said front hub flange and the facing side of said rear hub flange opposes a greater proportional area of said rear sidewall of said ring than the proportional area of said front sidewall arranged to oppose the facing side of said front hub flange.

3. The assembly of claim 1 wherein said means arranged to engage said annular stop ring extend from about the periphery of said front hub flange.

4. The assembly of claim 3 wherein said means arranged to engage said annular stop ring comprise a pad mount and a compression pad.

5. The assembly of claim 4 wherein said compression pad is positioned between said pad mount and said annular stop ring.

6. The assembly of claim 4 wherein a plurality of pad mounts are removably mounted in spaced alignment about the front of said hub.

7. The assembly of claim 6, wherein said pad mounts are arranged adjacent a plurality of compression pads.

8. The assembly of claim 1 wherein said facing sides of opposing flanges of said hub are tapered and the slot defined thereby tapers inwardly toward the central axis of the hub.

9. The assembly of claim 1 wherein said tire mounting rim comprises an inwardly extending circumferential valley.

10. The assembly of claim 1 the annular stop ring is integral with said tire mounting rim.

11. The assembly of claim 1 wherein said annular stop ring is removably mounted to said tire mounting rim.

12. The assembly of claim 1 wherein said annular stop ring is movably mounted within the central opening of said tire mounting rim and said mounting rim comprises an inwardly extending front stop ring flange arranged to resist axial movement of the annular stop ring.

13. The assembly of claim 1 comprising a brake component mounted to said hub.

14. The assembly of claim 13 wherein said brake component comprises a rotor.

15. The assembly of claim 1 wherein said resilient ring is donut shaped.

16. The assembly of claim 1 wherein said resilient rig is formed from an elastomer.

17. The assembly of claim 4 wherein said pad mount comprises an annular ring.

18. The assembly of claim 17 wherein said compression pad comprises a resilient ring.

\* \* \* \* \*